United States Patent
Hurst

(10) Patent No.: US 10,225,305 B2
(45) Date of Patent: Mar. 5, 2019

(54) ADAPTIVE DATA SEGMENT DELIVERY ARBITRATION FOR BANDWIDTH OPTIMIZATION

(71) Applicant: DISH TECHNOLOGIES L.L.C., Englewood, CO (US)

(72) Inventor: Mark B. Hurst, Cedar Hills, UT (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 0 days.

(21) Appl. No.: 15/912,283

(22) Filed: Mar. 5, 2018

(65) Prior Publication Data

US 2018/0198835 A1 Jul. 12, 2018

Related U.S. Application Data

(63) Continuation of application No. 14/754,541, filed on Jun. 29, 2015, now Pat. No. 9,930,084.

(60) Provisional application No. 62/019,319, filed on Jun. 30, 2014.

(51) Int. Cl.

| | |
|---|---|
| G06F 15/16 | (2006.01) |
| H04L 29/06 | (2006.01) |
| H04L 29/08 | (2006.01) |
| H04L 12/911 | (2013.01) |
| H04N 21/442 | (2011.01) |
| H04N 21/845 | (2011.01) |
| H04N 21/2343 | (2011.01) |
| H04N 21/6587 | (2011.01) |

(52) U.S. Cl.
CPC ......... *H04L 65/601* (2013.01); *H04L 47/823* (2013.01); *H04L 67/10* (2013.01); *H04N 21/23439* (2013.01); *H04N 21/44209* (2013.01); *H04N 21/6587* (2013.01); *H04N 21/845* (2013.01); *H04N 21/8456* (2013.01)

(58) Field of Classification Search
CPC ..... H04L 65/601; H04L 47/823; H04L 67/10; H04N 21/23439; H04N 21/44209; H04N 21/6587; H04N 21/845; H04N 21/8456
USPC ........................................................ 709/231
See application file for complete search history.

(56) References Cited

U.S. PATENT DOCUMENTS

| | | | |
|---|---|---|---|
| 9,078,008 B2 * | 7/2015 | Ye ........................ | H04N 19/597 |
| 9,258,333 B2 | 2/2016 | Bichot et al. | |
| 9,813,325 B2 * | 11/2017 | Syed ...................... | H04L 43/50 |
| 9,813,700 B1 * | 11/2017 | Bultje ................... | H04N 5/765 |

(Continued)

OTHER PUBLICATIONS

Canadian Intellectual Property Office, Official Action for Canadian Patent Application No. 2949380 dated Jun. 7, 2018.

(Continued)

*Primary Examiner* — Melvin H Pollack
(74) *Attorney, Agent, or Firm* — Lorenz & Kopf LLP

(57) ABSTRACT

Systems, devices and processes are described to adapt segment requests placed by an autonomous media player during media streaming to compensate for fluctuations in the bandwidth consumed by the requested segments due to variances in the underlying video content. By providing predictive data about the bandwidth consumption of upcoming video segments, client devices can adapt requests for future segments accordingly. Further, predictive consumption data can be shared between players operating within shared bandwidth to assist players needing additional bandwidth for upcoming video sequences.

20 Claims, 4 Drawing Sheets

(56) References Cited

U.S. PATENT DOCUMENTS

| | | | |
|---|---|---|---|
| 9,838,459 B2* | 12/2017 | Yu | H04L 65/4069 |
| 9,843,844 B2* | 12/2017 | Walker | H04N 21/6125 |
| 9,883,198 B2* | 1/2018 | Puri | H04N 19/615 |
| 9,900,630 B2* | 2/2018 | Gilson | H04N 21/23439 |
| 9,917,874 B2* | 3/2018 | Luby | H04N 21/23106 |
| 9,967,768 B2* | 5/2018 | Andersson | H04L 65/4084 |
| 9,992,499 B2* | 6/2018 | Su | H04N 19/142 |
| 9,998,750 B2* | 6/2018 | Rodriguez | H04N 19/513 |
| 10,063,606 B2* | 8/2018 | Bao | H04L 65/605 |
| 2009/0307368 A1 | 12/2009 | Sriram et al. | |
| 2011/0013692 A1* | 1/2011 | Cohen | H04N 19/139 |
| | | | 375/240.02 |
| 2013/0315296 A1* | 11/2013 | Zhang | H04N 19/103 |
| | | | 375/240.02 |
| 2014/0072029 A1* | 3/2014 | Zhai | H04N 19/172 |
| | | | 375/240.02 |
| 2015/0012928 A1* | 1/2015 | Chen | H04N 21/25866 |
| | | | 725/14 |

OTHER PUBLICATIONS

Korean Intellectual Property Office, Official Notice of Allowance for Korean Patent Application No. 10-2016-7033102 dated May 14, 2018.

\* cited by examiner

ADAPTIVE DATA SEGMENT DELIVERY ARBITRATION FOR BANDWIDTH OPTIMIZATION

PRIORITY CLAIM

This application is a continuation of U.S. patent application Ser. No. 14/754,541 filed on Jun. 29, 2015, which claims priority to United States Provisional Application Ser. No. 62/019,319 filed on Jun. 30, 2014, all of which are incorporated herein by reference.

TECHNICAL FIELD

The following generally relates to streaming media content over the Internet or another network. More particularly, the following discussion relates to systems, methods and devices that allow a media player device to improve delivery of an adaptive media stream by considering the bandwidth of the underlying content contained in the stream.

BACKGROUND

Media streaming is becoming an increasingly popular way of delivering television, movies and other media content to viewers. Media streams are typically point-to-point transmissions of digitized content that can be sent over the Internet or a similar network. Media streaming is often used to facilitate video on demand (VOD) services, remote storage digital video recorder (RSDVR) services, Internet Protocol television (IPTV) services, placeshifted media viewing and/or any number of other convenient services. Generally, the media stream is played back for the viewer in real time as the stream continues to be delivered to the player.

Often, media content is encoded into multiple sets of "streamlets" or other smaller segment files that can be individually requested and adaptively delivered to a particular client device. As changes in network bandwidth or other factors occur, the client device is able to react to the changes by requesting future segments that are encoded with different parameters (e.g., a higher or lower bit rate) for increased or decreased quality, as desired. Adaptive media streaming typically relies upon the media player client to control much of the streaming process. That is, the media player client, rather than the server, typically determines the next segment of the stream that will be requested and delivered to the player. Several examples of adaptive streaming systems, devices and techniques are described in US Patent Publication No. 2008/0195743, which is incorporated herein by reference as one example of an adaptive media streaming system.

One challenge that arises in video streaming is that that video content often consumes varying levels of bandwidth throughout the video presentation. A movie sequence showing an explosion, for example, can consume more bandwidth than a less dramatic scene encoded at the same bit rate, frame rate and resolution because the explosion is much less compressible. That is, the video imagery presents a greater dynamic range than imagery used in a more homogenous video scene. Even if two segments of video content are encoded at the same bit rate, frame rate and resolution, then, the sizes of the two segments can vary based upon the compressibility of the underlying video images being encoded. These variations can affect the quality of the viewer experience, particularly when a "low bandwidth" segment nevertheless contains a relatively large amount of data due to the un-compressibility of the underlying data.

It is therefore desirable to create systems, devices and methods that allow the client device to better control the adaptive streaming process. These and other desirable features and characteristics will become apparent from the subsequent detailed description and the appended claims, taken in conjunction with the accompanying drawings and this background section.

BRIEF SUMMARY

Several examples of methods, systems and devices to adapt requests for media stream segment data to compensate for bandwidth consumed are described. Many of the systems and processes described herein encode predictive data describing future segments of the media program into some or all of the data segments in a media stream so that the client media player is able to accurately predict the relative bandwidth consumption of upcoming media segments. If a particularly dynamic video sequence is upcoming, the media player may be able to recognize the increased demand and adapt accordingly.

Various embodiments provide a method executable by a client device having a processor and a memory to process a received media program made up of a series of segments selected from a plurality of media streams having different video qualities. The method suitably comprises: requesting or otherwise obtaining a first segment of the video program from a first media stream having a first quality, wherein the first segment comprises predictive data describing a bandwidth consumption of a future segment of the same media program; rendering the first segment of the video program for playback to a viewer; and selecting a second segment of the video program based at least in part upon the predictive data, wherein the selecting comprises selecting the second segment from a lower quality media stream of the same media program if the predictive data indicates that the bandwidth consumption of the future segment of the same media program will exceed the amount of bandwidth that is available to the client device.

Other embodiments provide a mobile phone, personal computer, tablet computer, video game player and/or other media player device. The media player device suitably comprises an interface to a network, a memory configured to store programming instructions, and a processor. The processor is programmed or otherwise configured to execute the programming instructions stored in the memory to process a received media program made up of a series of segments selected from a plurality of media streams having different video qualities. The processor requests or otherwise obtains a first segment of the video program from a first media stream having a first quality, wherein the first segment comprises predictive data describing a bandwidth consumption of a future segment of the same media program, and wherein the processor further selects a second segment of the video program based at least in part upon the predictive data by selecting the second segment from a lower quality media stream of the same media program if the predictive data indicates that the bandwidth consumption of the future segment of the same media program will exceed the amount of bandwidth that is available to the client device.

These features, along with additional and alternate features, aspects and other embodiments are described in more detail herein.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary system for providing adaptive media streams with predictive data via a data network;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments are able to improve the performance of a media stream through the use of predictive data encoded into the media segment. The predictive data gives an indication of the bandwidth that is likely to be consumed by upcoming media content. If a media player knows that a high-bandwidth sequence (e.g., an explosion) is coming up, it can adapt to this by requesting lower quality segments, by requesting other devices on the network to reduce their bandwidth consumption, and/or to take other actions as appropriate. By encoding predictive data into media segments, the media player is able to proactively adapt to upcoming changes in bandwidth, thereby avoiding overconsumption of network bandwidth and improving the user experience.

As noted above, many adaptive media encoding schemes encode segments of media content to represent a fixed period of time (e.g., 2 seconds or so in one embodiment). Even though each segment represents a common period of time, differences in underlying media content (e.g., compressibility of image data) can result in substantial differences in the sizes of the individual encoded media segments. A "lower quality" media segment representing two seconds of an explosion scene, for example, may be a larger data file than a segment representing two seconds of a more static image, even if the latter segment is encoded at a higher bit rate, frame rate, resolution and/or other quality parameter. These differences result from the dynamic range of the underlying data, which in turn can greatly affect the compressibility of the image data. These variations in segment size can substantially affect bandwidth consumption as the media stream is provided to one or more media players.

If the media player is aware of the actual or relative segment size prior to requesting the segment, however, the media player can adaptively request segments of greater or lesser quality if necessary to preserve quality of service for one or more media players on a network. To that end, various embodiments encode predictive data into one or more media segments that allows the media player to accurately predict the actual or relative size of upcoming media segments, and to react accordingly.

Figure 1:
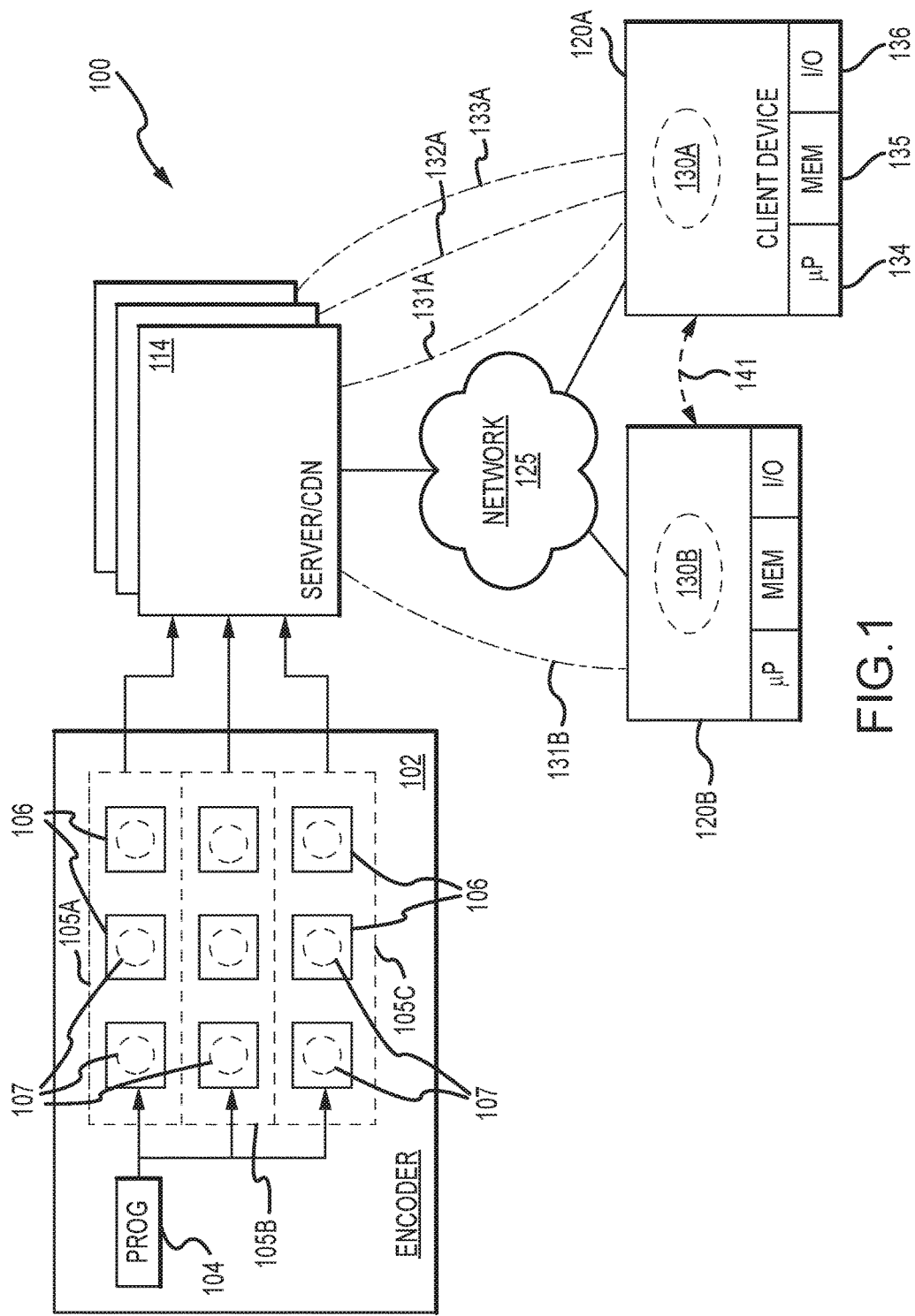

Turning now to the drawing figures and with initial reference to FIG. 1, an exemplary system 100 to adaptively deliver media streams to client device 120 using multiple connections 131, 132, 133 over a network 125 is shown. System 100 suitably includes an encoder 102 and a media server 114. The various components shown in FIG. 1 may be jointly provided by a common service provider, or different service providers may work together to provide different components of the system 100. A television network or other content provider could provide content that is already encoded in the appropriate formats, for example, thereby obviating the need for a separate encoder 102 in some implementations. Similarly, unicast and/or multicast hosting could be performed by any sort of content delivery network (CDN) or other service 114, as appropriate.

Encoder 102 is any device or service capable of encoding media programs 104 into one or more adaptive streams 105A-C. In the exemplary embodiment shown in FIG. 1, encoder 102 is a digital computer system that is programmed to create multiple streams 105A-C each representing the same media program 104 in its entirety. Typically, each stream 105A-C is made up of smaller segments 106 that represent a small portion of the program in a "streamlet" or other individually-addressable data file. Each stream 105A-C is typically encoded so that segments 106 of the different streams 105A-C are interchangeable with each other based upon a common time index. That is, a client media player 120 can mix and match segments 106 from different streams 105A-C to continue seamless playback even as network conditions or other resources change. If resources are becoming constrained, the player 120 can request lower quality segments 106. Conversely, if resources are abundant, then higher quality segments 106 can be requested. Media players 120 are typically able to "upshift" and "downshift" between different quality levels 106 as conditions warrant by simply requesting data segments from whatever set 105 is appropriate for the particular conditions occurring at a particular time.

Generally, the sets of segments 106 making up each stream 105 are stored on a content delivery network (CDN) or other server 114 for distribution on the Internet or another network 125. Typically, a media player application 130 executing on one or more client device 120 contains intelligent logic to select appropriate segments 106 as needed to obtain and playback the media program 104. As noted above, segments 106 may be interchangeable between streams 105 so that higher bandwidth segments 106 may be seamlessly intermixed with lower bandwidth segments 106 to reflect changing network or other conditions in delivery over network 125. In some implementations, the media player 130 initially obtains a digest or other description of the available segments so that the player itself can request the segments 106 as needed. Often, such requests can be processed using conventional hypertext transport protocol (HTTP) constructs that are readily routable on network 125 and that can be served by conventional CDN or other web-type servers 110.

As noted above, some or all of the segments 106 in sets 105A-C are encoded to provide predictive data 107 that indicates a size of one or more upcoming media segments 106. In various embodiments, the predictive data 107 may be implemented with one or more data bits providing a desired level of resolution. A single bit, for example, could indicate that future segments 106 are "low" or "high" bandwidth, or the bit could be used as a flag to indicate when particularly high bandwidth segments 106 are coming up. Additional bits could be used to provide any level of resolution, up to an encoded representation of the actual size of an upcoming segment 106. In an example embodiment, four bits are used to indicate sixteen different bandwidth levels; other embodiments could use fewer bits or more bits for different levels of resolution, and/or the level of resolution could be adapted during operation, as desired.

The distance predicted by the predictive data 107 could be set to any level, in accordance with the particular implementation. The predictive data 107 should provide enough lead time so that the player application 130 is able to receive the segment 106, to parse the predictive data 107 contained in the segment, and to consider the predictive data 107 prior to making requests for the predicted segments 106. In an example embodiment, data 107 may predict about ten seconds (e.g., about five two-second media segments) or so into the future of the stream 105, although other embodiments may provide more or less lead time, as desired.

Predictive data 107 may be encoded into segments 106 belonging to each of the available quality streams 105. Even if a media player 130 shifts between streams 105, the predictive bandwidth consumption will still be useful in at least relative terms. That is, even though the different streams 105 are encoded at different bit rates or other quality parameters, the relative bandwidth consumption of the different segments 106 within the same streams 105 will still be predictable in most cases, even if the media player is shifting between segments 106 of different streams 105.

Although FIG. 1 shows only a single server 114, many implementations could spread streams 105 and/or segments 106 across any number of servers 114 for convenient delivery to device 120 located throughout network 125. The multiple data connections 131, 132, 133 could be established with a common server 114, or with different servers 114 depending on the particular embodiment.

Each client device 120 is any sort of device capable of receiving streaming media content via network 125. In various embodiments, client device 120 could be implemented with a mobile phone or other portable device, a computer system executing a media player application 130, a tablet or notebook computer, a video game player, a standalone media player, a television or television receiver, a video recorder and/or any number of other consumer-controlled devices. To that end, each client device 120 is typically a consumer owned and operated device with a conventional processor 134 or the like along with associated memory 135 or other data storage. Client device 120 also includes appropriate interfaces 136 for user interaction, network access and other input/output features as desired. Various client devices 120 may be equipped with any conventional hardware or software capabilities that are conventionally found in consumer electronics or personal computing products, or the like.

As stated above, each client device 120 typically executes its own media player software 130 that is able to adaptively request segments 106 belonging to any of the different streams 105A-C associated with a program 104 that is being presented to the viewer. By requesting segments 106 that were encoded using different parameters, the media stream being provided to the media client 130 can be adjusted "on the fly". As conditions dictate, each media player 130A-C is able to reduce demands on system resources by requesting lower bandwidth segments 106, by redirecting segment requests to different servers 114 or CDNs, or by taking other actions as appropriate. In still further embodiments, the media player 130 is able to manage the various connections 131, 132, 133 to servers 114 so that needed data can be delivered more efficiently and in a timely manner. FIG. 1 shows three connections 131A, 132A and 133A providing segments 106 to client device 120A and a single connection 131B providing segments 106 to client device 120B; other embodiments may incorporate any number of client devices 120 operating within shared bandwidth, each having any number of connections 131, 132, 133 to any number of data sources 114.

Predictive data 107 may be used in any manner. In some implementations, each client device 120A-B is able to predict its own future demand for network bandwidth more accurately through the use of data 107. If a media player on device 120 recognizes that bandwidth is limited, for example, and that upcoming content will demand additional bandwidth, then the media player can proactively avoid bandwidth overload by requesting segments 106 from lower quality streams 105. Conversely, the media player 130 could make use of additional bandwidth and/or more compressible future content by requesting segments 106 from higher quality streams 105 when conditions warrant. The client device 120 can therefore consider the bandwidth demands of the content itself in addition to any other factors ordinarily considered in selecting segments 106 or in shifting between streams 105.

Further embodiments could additionally or alternately share predictive data 107 with other client devices 120 operating within the same shared bandwidth. If multiple client devices 120 are operating on the same LAN or within the same home, for example, these devices can locate each other as appropriate (e.g., by recognizing each other on the LAN, by consulting a service on network 125, through any sort of discovery protocol, and/or the like) and share indicia 141 of upcoming bandwidth consumption in any manner. If one device 120A becomes aware through predictive data 107 that high bandwidth data segments are forthcoming, for example, that device 120A can send indicia 141 on the local network to request that other devices 120B operating within the shared bandwidth "throttle back" to make room for the upcoming high bandwidth content. These indicia 141 may be formatted in any manner for transmission on the LAN or other shared network space. In some embodiments, indicia 141 may be sent as broadcasts on a LAN or other network even if other devices 120 have not been identified, or if their particular addresses are not known. Devices 120 receiving indicia 141 may be programmed to reduce their own bandwidth consumption (e.g., by requesting lower quality segments 106) to assist the device 120 that sent the indicia 141. Indicia 141 may provide the same information as predictive data 107 in some embodiments; other embodiments may simply provide indicia 141 as a flag or the like, with lower levels of resolution than the predictive data 107 provided with the received segments 106. Equivalent embodiments could be modified in any manner.

Figure 2:
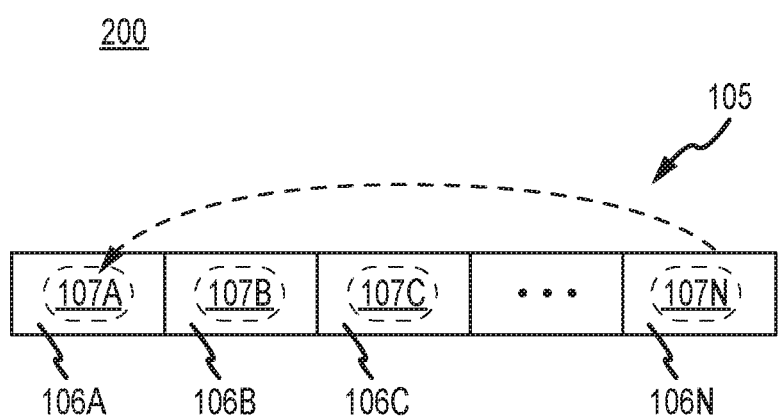
FIG. 2 is a diagram of a series of data segments having predictive data.

FIG. 2 shows an example representation of a series of sequential media segments 106A-N that contain predictive data 107A-N, respectively. Each predictive data 107 contains a numerical representation that describes the bandwidth of a future segment. In this example, the predictive data indicates an actual or relative size of a media segment that is 'N' segments into the future. As indicated above, "N" could represent any integer value from one to ten, or even more, depending on the embodiment and the amount of lead time desired. Other embodiments may represent the predictive data 107 using any number of data bits within the segment 106. A single bit could be used as a flag to indicated upcoming bandwidth consumption, for example, or any number of additional bits could be used to provide additional levels of resolution. Although FIG. 2 shows predictive data 107 being encoded into each segment 106 in stream 105, other embodiments may provide predictive data 107 in only a subset (e.g., every 2, 3, 5, 10, etc. segments) as desired. Still other embodiments could provide predictive data 107 on an as-needed basis (e.g., only when high bandwidth content is coming up, or only when substantial changes in bandwidth are coming, etc.). Although FIG. 2 shows predictive data 107 always indicating the bandwidth of a fixed number of segments 106 into the future, other embodiments could provide two indicia in data 107: a first value representing the bandwidth consumption and a second value indicting the time or number of segments 106 into the future. This second value could be used to provide multiple "warnings" of impending bandwidth consumption, or for further flexibility as desired. Predictive data 107 may be encoded or represented in any manner, and equivalent embodiments could implement predictive data 107 within data segments 106 in any other manner.

Figure 3:
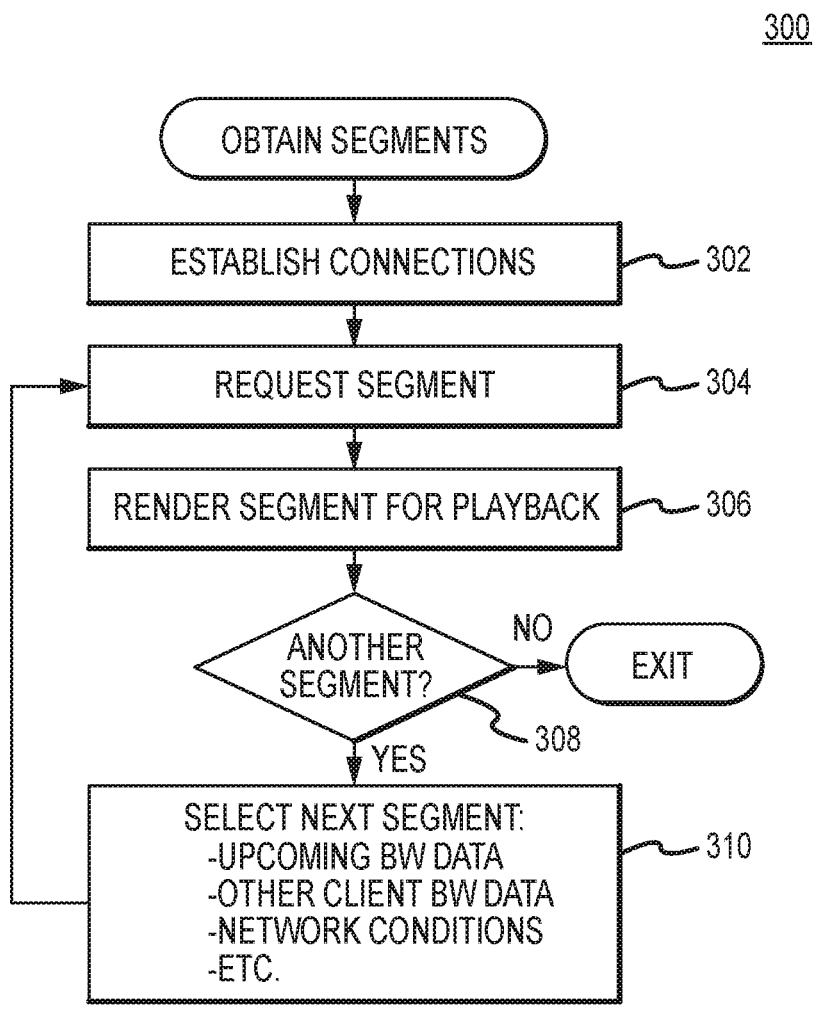
FIG. 3 is a flowchart of an exemplary process for adapting the requesting of segment data to consider predictive data.

FIG. 3 shows an example process 300 executable by a media player application 130 or other logic executed by media device 120. In various embodiments, process 300 is implemented in software or firmware residing in memory 135 and executed by processor 134 of media device 120. Other embodiments may implement process 300 in any other manner.

As shown in FIG. 3, the media player 120 suitably establishes one or more media connections 131, 132, 133 as desired (function 302). Although the foregoing discussion makes reference to three simultaneous connections, other embodiments may use only a single connection, or any number of additional connections 131-133 may be established as desired. Each connection allows media player 120 to request segments 106 of a media stream (function 304). As noted above, each segment 106 is provided as a separate data file that encodes a fixed time portion of the requested media stream. This encoded media content can be extracted, decoded and rendered for playback to the viewer as desired (function 306). Additional segments 106 are requested (function 308) until playback of the media stream is complete.

The media player device 120 suitably selects and requests segments 106 of the media stream that are appropriate for then-current resources and conditions (function 310). In conventional adaptive streaming applications, the next segment 106 is typically selected from segments 106 of varying qualities (i.e., of varying sizes) based upon network bandwidth, available processing resources, and other factors as appropriate. When one or more received segments 106 contains predictive data 107, however, this additional information can also be considered in requesting future segments 106. If the predictive data 107 indicates that a relatively high-bandwidth segment 106 is coming up, then the media player 130 may wish to proactively request a lower quality segment 106 if appropriate to do so. The determination of whether or not to change to a different quality can be based upon any number of factors. In some embodiments, the switch will occur if the amount of available bandwidth is less than the expected future consumption; that is, if the predicted bandwidth exceeds the amount of bandwidth that is currently available (or that is predicted to be available), then a downshift would be warranted. Other embodiments for up and down shifting can consider current performance, past or present bandwidth oscillations, and/or other factors as appropriate. While some embodiments may automatically downshift upon notification of an upcoming high bandwidth scene, other embodiments will consider the current or predicted bandwidth availability and will only downshift if the predicted consumption exceeds the predicted availability. Some implementations may also wish to reserve a certain amount of bandwidth for unpredicted network fluctuations or other conditions, as desired.

In some implementations, player 130 may gradually ratchet to a lower quality stream 105 to prevent visible shocks to the user experience. That is, rather than jumping immediately from a high quality segment 106 to a much lower quality segment 106, the player 130 might request segments 106 from intervening quality levels 105 to smooth the user experience.

Predictive data 107 can also be shared between media player devices 120A-B as described above. In various embodiments, each media player 120 can recognize that another player 120 is operating on the same network or is otherwise sharing bandwidth with the current player 120. In such cases, the predictive data 107 can be shared, or other indications 141 based upon the predictive data 107 can be exchanged, between the players 120 so that if one player 120 has an upcoming high-bandwidth video scene, the other player 120 can proactively reduce its consumption of the shared bandwidth to assist the more laden player 120. If one viewer is watching a show with a highly dynamic action sequence, for example, and another viewer on the same data network is watching a relatively static news show or the like, the two players 120 could cooperate so that the viewer watching the action sequence receives a greater percentage of the shared bandwidth in comparison to the viewer watching the more compressible content.

Figure 4:
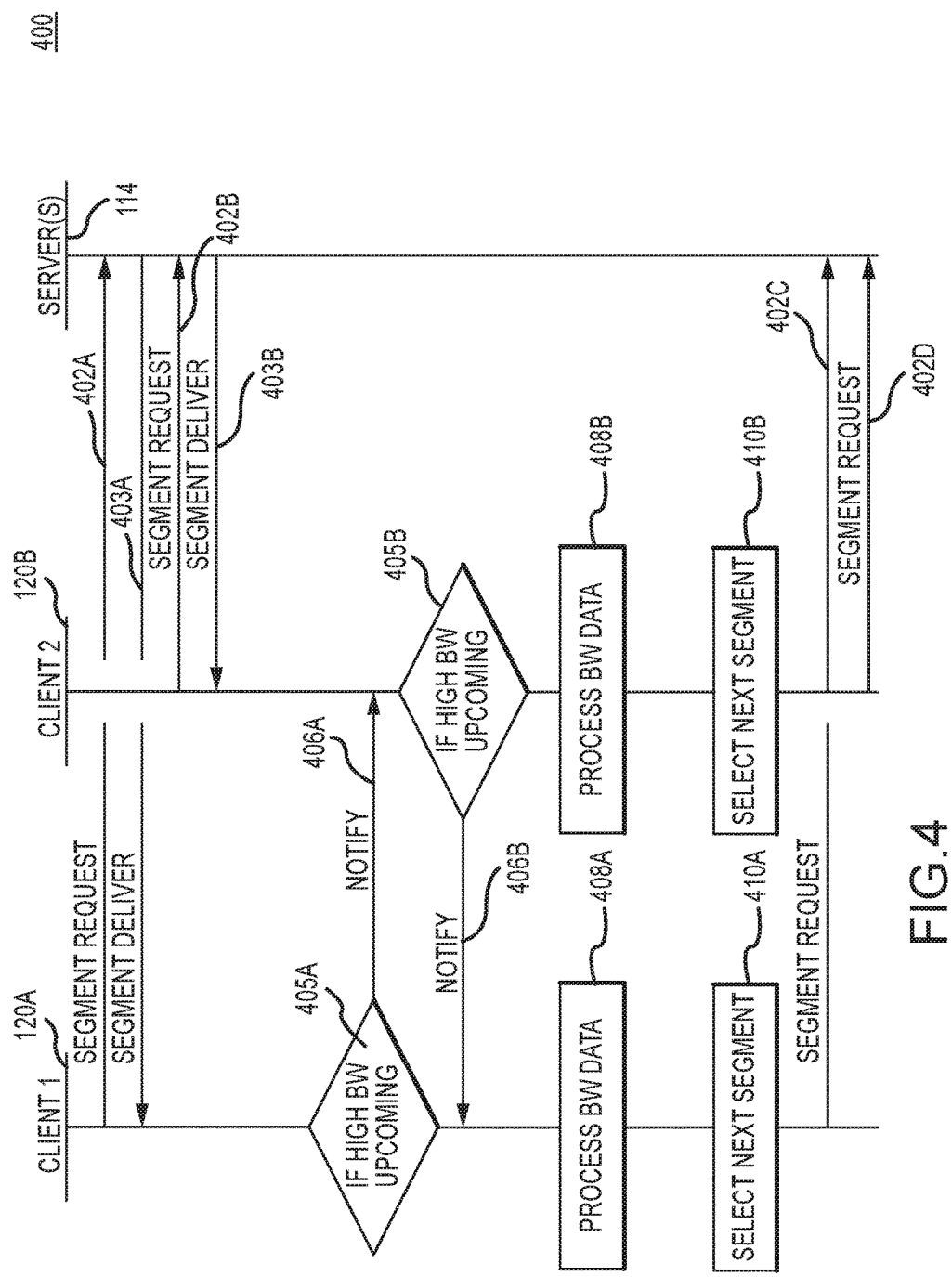
FIG. 4 is a diagram of an exemplary process for sharing bandwidth on a network using predictive data.

FIG. 4 shows a diagram of an example process 400 for sharing predictive information 107. As shown in FIG. 4, each client device 120A-B suitably requests segments 106 (functions 402A-B) and receives requested segments (functions 403A-B) from server 114. Each client 120A-B processes the predictive data 107 contained within the delivered segments 106 to identify if a relatively high bandwidth sequence is coming up in the near future (functions 405A-B, respectively). If so, then a notification 406A-B can be sent to the other player to indicate that the transmitting player 120 is intending to consume additional bandwidth in the near future. Notifications 406A-B may correspond to indicia 141 described above, as appropriate. As noted herein, predictive data 107 may be shared routinely between players 120; players may exchange frequent indicia of upcoming bandwidth, if desired, or notifications 406A-B could alternately occur only when a player 120 recognizes that it has an immediate need for additional bandwidth. Bandwidth notifications 406A-B may be formatted as addressed or broadcast network packets in any protocol that is compatible with the LAN or other underlying shared network topology.

Each media player 120A-B selects its upcoming data segments 106 based upon factors such as then-available network bandwidth, then-available computing resources, predictive data 107 obtained from previously-requested segments 106, and/or any predictive data 107 or other indicia 141 provided by other media players 120 operating on the shared network (function 408A-B). This additional information about upcoming bandwidth needs can allow each media player 120 to make more accurate selections (function 410A-B) for segments 106 that match available bandwidth, as appropriate. The selected media segments 106 can therefore be requested from media server 114 or another appropriate source, as desired (functions 402C-D).

The foregoing discussion therefore considers several different systems, devices and methods to improve the delivery of one or more adaptive media streams through encoding and delivery of predictive data about future media segments. These general concepts may be expanded or modified as desired to create any number of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a client device to process a received media program made up of a series of segments selected from a plurality of media streams having different video qualities, the method comprising:
   requesting and receiving a first one of the series of segments of the video program from a first media stream having a first quality from a server via a network, wherein the first segment received from the server comprises predictive data that describes a bandwidth consumption of a future segment of the same media program;
   rendering the first segment of the video program for playback to a viewer;
   adaptively selecting one of the plurality of different video qualities for the future segment of the video program based at least in part upon the predictive data received with the first segment; and
   requesting the future segment having the selected video quality from the server via the network.

2. The method of claim 1 wherein the predictive data indicates a size of the future segment.

3. The method of claim 2 wherein the size of the future segment indicated by the predictive data is greater when the content encoded in the future segment is less compressible than the content encoded in the first segment.

4. The method of claim 1 wherein the selecting comprises determining an amount of available bandwidth and comparing the determined about of available bandwidth to a predicted bandwidth based upon the predictive data.

5. The method of claim 4 wherein the selecting comprises selecting the video quality of the future segment from a lower quality one of the plurality of media streams of the same media program if the predictive data indicates that the bandwidth consumption of the future segment of the same media program exceeds the amount of available bandwidth.

6. The method of claim 5 wherein the selecting comprises selecting the video quality of the future segment from a higher quality media stream when the amount of predicted bandwidth based upon the predictive data is less than the amount of available bandwidth.

7. The method of claim 1 further comprising the client device transmitting indicia of the predictive data received with the first segment to thereby indicate an anticipated need for future bandwidth to other media player devices on the network.

8. The method of claim 1 wherein the selecting comprises adapting a subsequent request for the future segment of the media stream based upon indicia received from a different client device operating on the same network.

9. The method of claim 8 wherein the indicia indicates that the different client device operating on the same network needs additional bandwidth.

10. The method of claim 9 wherein the adapting of the subsequent request comprises requesting the future segment from a lower quality stream to thereby preserve bandwidth on the same network for the different client device.

11. The method of claim 1 wherein the client device comprises a processor and a memory, and wherein the processor is programmed to perform the receiving and transmitting.

12. A media player device comprising:
   an interface to a network;
   a memory configured to store programming instructions; and
   a processor configured to execute the programming instructions stored in the memory to process a received media program made up of a series of segments selected from a plurality of media streams having different video qualities available from a server via the network, and wherein the processor places a request to the server via the network for a first segment of the video program from a first media stream having a first quality and receives the first segment of the video program from the server, wherein the first segment received from the server comprises predictive data describing a bandwidth consumption of a future segment of the same media program, and wherein the processor further adaptively selects a video quality of the future segment of the video program based at least in part upon the predictive data, and wherein the processor requests the future segment from the media stream having the adaptively-selected video quality.

13. The media player device of claim 12 wherein the media player device selects a lower quality media stream of the same media program if the predictive data indicates that the bandwidth consumption of the future segment of the same media program will exceed the amount of bandwidth that is available to the client device.

14. The media player device of claim 12 wherein a size of the future segment indicated by the predictive data is greater when the content encoded in the future segment is less compressible than the content encoded in the first segment.

15. The media player device of claim 14 wherein the quality of the future segment is selected by determining an amount of available bandwidth and by comparing the determined about of available bandwidth to a predicted bandwidth based upon the predictive data.

16. The media player device of claim 11 wherein the quality of the future segment of the media stream is selected based upon indicia received from a different client device operating on the same network that indicates that the different client device operating on the same network needs additional bandwidth.

17. The media player device of claim 16 wherein the processor responds to the indicia by requesting the future segment from a lower quality stream to thereby preserve bandwidth on the same network for the different client device.

18. A method executable by a server device to process a media program made up of a series of segments selected from a plurality of media streams having different video qualities by a client device, the method comprising:
   receiving a request for a first one of the series of segments of the video program from a first media stream having a first quality from the client device via a network, wherein the first requested segment comprises predictive data that describes a bandwidth consumption of a future segment of the same media program;
   in response to the request, transmitting the first requested segment to the client device via the network;
   receiving a second request via the network from the client device, wherein the second request is based upon the client device adaptively selecting one of the plurality of different video qualities for the future segment of the video program based at least in part upon the predictive data received with the first segment, so that the video quality of the future segment is selected from a lower quality one of the plurality of media streams of the same media program if the predictive data indicates that the bandwidth consumption of the future segment of the same media program will exceed the amount of bandwidth that is available to the client device; and transmitting the future segment having the selected video quality from the server to the client device via the network.

19. The method of claim 18 wherein the predictive data indicates a size of the future segment.

20. The method of claim 18 wherein the size of the future segment indicated by the predictive data is greater when the content encoded in the future segment is less compressible than the content encoded in the first segment.

* * * * *